United States Patent
Fujii et al.

(10) Patent No.: US 7,897,263 B2
(45) Date of Patent: Mar. 1, 2011

(54) WIRE-GRID METAL SHEET AND WIRE GRID

(75) Inventors: Takashi Fujii, Otsu (JP); Kazuyuki Hirao, Soraku-gun (JP); Kenji Kitamoto, Soraku-gun (JP); Toshinaga Futaku, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/323,522

(22) Filed: Nov. 26, 2008

(65) Prior Publication Data

US 2009/0136777 A1 May 28, 2009

Related U.S. Application Data

(63) Continuation of application No. PCT/JP2007/058943, filed on Apr. 25, 2007.

(30) Foreign Application Priority Data

May 31, 2006 (JP) ............................... 2006-152712

(51) Int. Cl.
*B32B 3/10* (2006.01)
*B32B 3/24* (2006.01)
*G02B 5/30* (2006.01)
*G02B 27/28* (2006.01)

(52) U.S. Cl. .................... 428/596; 428/606; 428/44; 428/45; 428/66.6; 359/486

(58) Field of Classification Search .................. 428/596, 428/597, 606, 44, 45, 66.6, 64.1; 359/483, 359/486
See application file for complete search history.

(56) References Cited

U.S. PATENT DOCUMENTS

| 4,565,745 | A | * | 1/1986 | Kaminskas | ................. 428/596 |
| 5,265,273 | A | * | 11/1993 | Goodwin et al. | ............. 455/347 |
| 2003/0016358 | A1 | | 1/2003 | Nagashima et al. | |
| 2003/0041367 | A1 | * | 3/2003 | Hadden et al. | ................. 2/195.5 |
| 2003/0094296 | A1 | * | 5/2003 | Kojima et al. | .......... 174/35 MS |
| 2003/0151898 | A1 | | 8/2003 | Tetsuka et al. | |

FOREIGN PATENT DOCUMENTS

| JP | 3047639 U | 4/1998 |
| JP | 2003-66228 A | 3/2003 |
| JP | 2006-078665 A | 3/2006 |
| JP | 2006-84776 A | 3/2006 |
| WO | 2006/033253 A1 | 3/2006 |

OTHER PUBLICATIONS

Official Communication issued in International Patent Application No. PCT/JP2007/058943, mailed on Jul. 17, 2007.
Yoshihara, "Butsuri Kogaku", Kyoritsu Shuppan Co., Ltd., 1966 First Edition, pp. 216-217.

* cited by examiner

*Primary Examiner*—Michael La Villa
(74) *Attorney, Agent, or Firm*—Keating & Bennett, LLP

(57) ABSTRACT

A wire-grid metal sheet includes a grid portion defined by a plurality of spaced strip-shaped longitudinal members extending longitudinally and cross members extending substantially perpendicular to the longitudinal members. A wire grid is made by attaching the wire-grid metal sheet to a frame. The cross members are arranged at intervals at least about five times greater than those of the longitudinal members. The longitudinal members and the cross members may define a lattice pattern. Alternatively, the longitudinal members or the cross members may be arranged in a staggered manner.

5 Claims, 5 Drawing Sheets

300GHz

300GHz

300GHz

300GHz

WIRE-GRID METAL SHEET AND WIRE GRID

BACKGROUND OF THE INVENTION

1. Field of the Invention

The present invention relates to a metal sheet used as a wire grid defining a polarizing component for terahertz waves, a wire grid having the metal sheet, and a method for making the wire grid.

2. Description of the Related Art

Wire grids are polarizing components commonly used for optical waves and electromagnetic waves. YOSHIHARA, Kunio "Butsuri Kogaku" (Kyoritsu Shuppan Co., Ltd., 1966 First Edition) p. 216 discloses an example of such wire grids. Japanese Unexamined Patent Application Publication No. 2003-14620 describes a wire grid included in a polarization analyzing apparatus for terahertz waves.

FIG. 1 illustrates a wire grid. As illustrated in FIG. 1, the wire grid for terahertz waves is obtained by arranging long, thin metal strips 1 across a frame 2 at regular intervals. For example, the metal strips 1 may be tungsten wires with a diameter of several tens of μm and are regularly arranged at about a pitch of about 100 μm.

The diameter and pitch of the metal strips are determined according to the wavelength used. For terahertz waves, the diameter of metal strips is in the range of about 10 μm to about 300 μm, and the pitch thereof is in the range of about 30 μm to about 1 mm.

When wire grids are used as polarizers for terahertz waves as described above, the diameter of the wire grids are in the range of about 20 mm to about 100 mm. In a 100-mm-diameter wire grid, in which the length of metal strips is up to about 100 mm, it is difficult to arrange such long and thin metal strips in parallel. That is, since tension tends to cause breakage of the metal strips and variations in distances between adjacent metal strips, it is very difficult to make the wire grid. As a result, the wire grid is very expensive to produce.

On the other hand, there are commercially available wire grids that are made by forming a thin film on a substrate through which electromagnetic waves are transmitted and, for example, etching the thin film to form a fine wiring pattern. In addition, there are commercially available wire grids that are made by dispersing metal particles in a base material, such as resin or glass and, for example, drawing the base material to form fine wires in the base material. In the configuration in which a substrate or a base material is used as described above, since a phenomenon, such as a multiple reflection or interference, occurs depending on the physical property, such as refractive index, reflectance, or absorption index of the substrate or the base material, special steps must be taken to avoid such a phenomenon.

SUMMARY OF THE INVENTION

To overcome the problems described above, preferred embodiments of the present invention provide a method of making a wire-grid metal sheet and a wire grid that are designed for terahertz waves, that can be easily made with high precision, and that are inexpensive.

A wire-grid metal sheet according to preferred embodiments of the present invention is a free-standing wire-grid metal sheet made of only metal and not including the above-described wires, substrate, and base material. The wire-grid metal sheet according to preferred embodiments of the present invention includes a plurality of spaced strip-shaped longitudinal members extending longitudinally and at least one cross member extending in a direction substantially perpendicular to the longitudinal members, the longitudinal members and the at least one cross member defining a grid portion.

The cross members may preferably be arranged at intervals, for example, at least about five times greater than those of the longitudinal members.

The longitudinal members and the cross members may preferably define, for example, a lattice pattern.

The longitudinal members or the cross members may preferably be arranged, for example, in a staggered arrangement.

A wire grid of preferred embodiments of the present invention preferably includes the above-described wire-grid metal sheet and an annular frame attached to both sides of the wire-grid metal sheet.

A method for making the wire grid according to a preferred embodiment of the present invention includes the steps of preparing a metal sheet, and processing the metal sheet to form a plurality of longitudinal members extending longitudinally and at least one cross member extending in a direction substantially perpendicular to the longitudinal members, the longitudinal members and the at least one cross member defining a grid portion.

The metal sheet may preferably be processed, for example, by punching.

Alternatively, the metal sheet may preferably be processed by performing the steps of coating the metal sheet with an etching resist film, patterning the etching resist film, etching, and removing the etching resist film.

Since a plurality of spaced strip-shaped longitudinal members extending longitudinally and at least one cross member extending substantially perpendicular to the longitudinal members are provided, a wire grid can be made by processing a metal sheet. That is, since at least one cross member is provided, even when a thin metal sheet is processed by punching or etching, breakage and warpage of the longitudinal members is significantly reduced during the processing and during handling after processing. In addition, variations in distances between adjacent longitudinal members caused by the longitudinal members being stretched by stress imposed thereon during or after the processing are significantly reduced.

Since the cross members are preferably arranged at intervals at least about five times greater than those of the longitudinal members, a wavelength for which the cross members act as a grid is at least about five times longer than the target wavelength. Therefore, there is substantially no adverse effect on the polarizing and analyzing characteristics for the target wavelength.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A wire-grid metal sheet of a first preferred embodiment of the present invention and a method for making a wire grid will be described with reference to FIG. 2 to FIG. 5.

Figure 1:
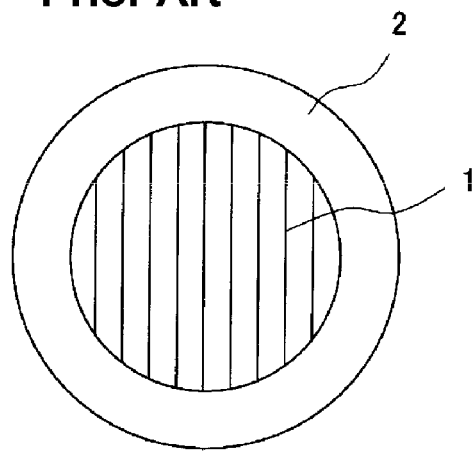
FIG. 1 illustrates a structure of a conventional wire grid.
Figure 2:
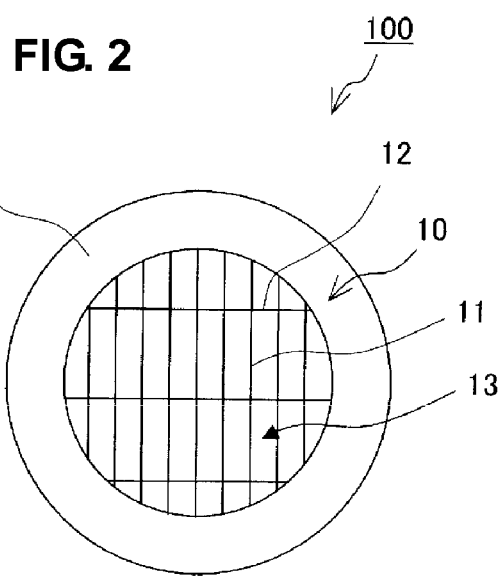
FIG. 2 illustrates a structure of a wire grid according to a first preferred embodiment of the present invention.

FIG. 2 is an external view of a complete wire grid. A wire grid 100 is obtained by attaching a circular wire-grid metal sheet 10 to an annular frame 20. The wire-grid metal sheet 10 includes a grid portion 13 including a plurality of spaced strip-shaped longitudinal members 11 extending longitudinally and cross members 12 extending substantially perpendicular to the longitudinal members 11 and spaced apart more widely than the longitudinal members 11.

The longitudinal members 11 and the cross members 12 may slightly obliquely cross each other. In other words, the longitudinal members 11 and the cross members 12 may cross each other at substantial right angles.

The annular frame 20 supports the circular wire-grid metal sheet 10 on both sides of the wire-grid metal sheet 10 with screws in the annular frame 20. Alternatively, the wire-grid metal sheet 10 may be attached to the frame 20 with an adhesive or other suitable method.

Figure 3:
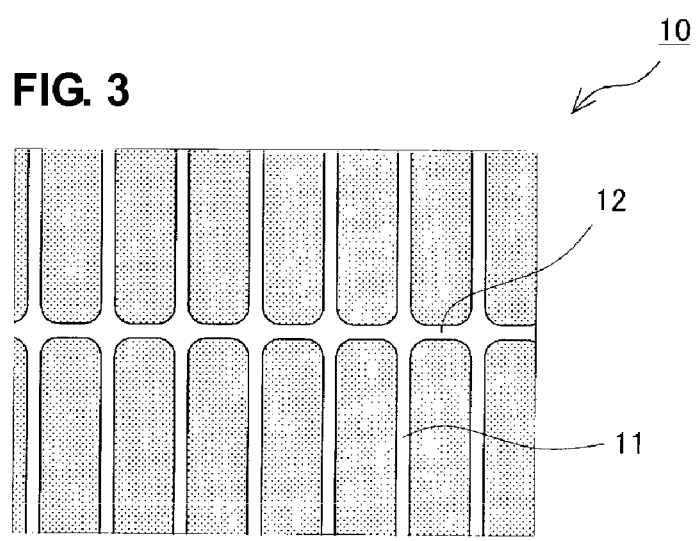
FIG. 3 is a partially enlarged view of a wire-grid metal sheet for the wire grid of the first preferred embodiment of the present invention.

FIG. 3 is a partially enlarged view of the grid portion illustrated in FIG. 2. The wire-grid metal sheet 10 is produced in the following manner.

First, a rectangular thin metal sheet of phosphor bronze preferably having a thickness of about 0.1 mm, for example, is prepared.

Next, punching is performed on the thin metal sheet using a punch that is preferably about 0.3 mm in width and about 3 mm in length, for example. In this punching, the thin metal sheet is preferably punched into pieces corresponding to the grid portion 13 one by one with the punch. Instead of punching the thin metal sheet into pieces one by one with the punch, a die for simultaneously punching out a number of pieces may be provided. For example, a die for simultaneously punching out one or two rows of pieces may be provided.

Since it is more difficult, in terms of processing, to cut the thin metal sheet in the longitudinal direction, the direction of punching is substantially parallel to the longitudinal members 11. However, the direction of punching may be substantially parallel to the cross members 12.

After punching, the wire-grid metal sheet is gold-plated to improve the environmental resistance and conductivity of the wire-grid metal sheet.

Then, the wire-grid metal sheet is cut in a desired circular or substantially circular shape. The wire-grid metal sheet 10 is sandwiched on both sides thereof by the annular frame 20 provided with screws and made of non-magnetic material, such as aluminum or brass, for example.

In FIG. 3, the longitudinal members 11 are portions interposed between laterally adjacent holes, while the cross members 12 are portions interposed between longitudinally adjacent holes. The distance between adjacent holes is preferably about 0.1 mm in both the longitudinal and transverse directions, for example. This means that each of the longitudinal members 11 and the cross members 12 have a width of about 0.1 mm, for example.

As illustrated in FIG. 3, the intersections of the longitudinal members 11 and cross members 12 have a substantially diamond shape, because the edges of the punch described above are preferably rounded off. This reduces stress concentration on the intersections and increases the strength of the intersections. Therefore, it is possible to reduce stress imposed on the metal sheet during the punching process and to improve the function of the cross members 12 in that the distances between adjacent longitudinal members 11 are maintained substantially constant.

When the wire grid 100 illustrated in FIG. 2 and FIG. 3 is used as a polarizer or an analyzer, electromagnetic waves are made substantially incident on the wire grid 100 in a direction substantially perpendicular to the surface thereof. When the plane of polarization of incident electromagnetic waves is parallel to the longitudinal members 11 of the wire grid 100, the electric field components of the electromagnetic waves cause a current to be generated in the longitudinal members 11. Since this causes the electric field components to be reflected or absorbed, the electromagnetic waves are not transmitted through the wire grid 100. The width of each longitudinal member 11 is substantially smaller (about $1/10$ or less) than the wavelength. Therefore, when the plane of polarization of incident electromagnetic waves is substantially perpendicular to the longitudinal members 11, since the loss of the electric field components caused by the passage of current through the longitudinal members is negligible, the electromagnetic waves are transmitted through the wire grid 100. Thus, the wire grid functions as a polarizer or an analyzer.

As illustrated in FIG. 2 and FIG. 3, the wire-grid metal sheet of preferred embodiments of the present invention includes the cross members 12 extending substantially perpendicular to the longitudinal members 11. Distances between adjacent cross members 12 are much greater than the wavelength of the target electromagnetic waves (here, the cross members 12 are spaced at least five times more widely than the longitudinal members). Therefore, during the transmission of the target electromagnetic waves, the loss caused by the presence of the cross members 12 is negligible.

Since it has been confirmed that the distance between adjacent longitudinal members (i.e., the size obtained by subtracting the width of each longitudinal member from the pitch) is optimal when it is about three times the width of each longitudinal member (i.e., when the pitch of the longitudinal members 11 is about four times the width of each longitudinal member 11), the dimensions of a punching tool used during punching are set to satisfy these conditions.

Figure 4A:
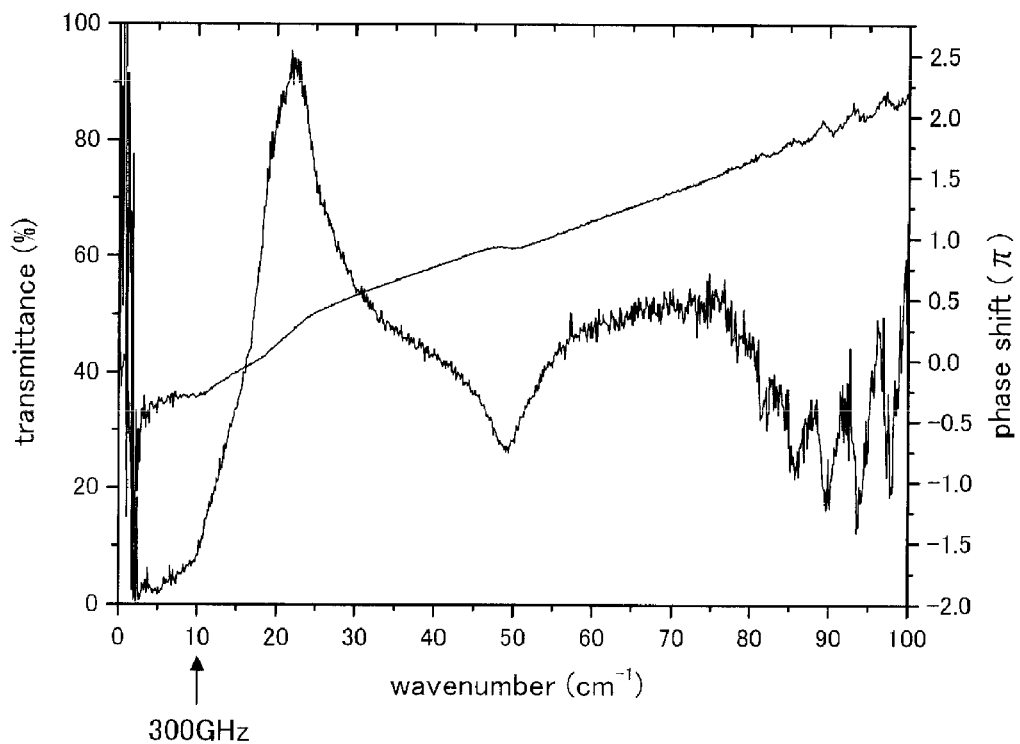
FIGS. 4A and 4B are graphs showing characteristics of the wire grid of the first preferred embodiment of the present invention.
Figure 4B:
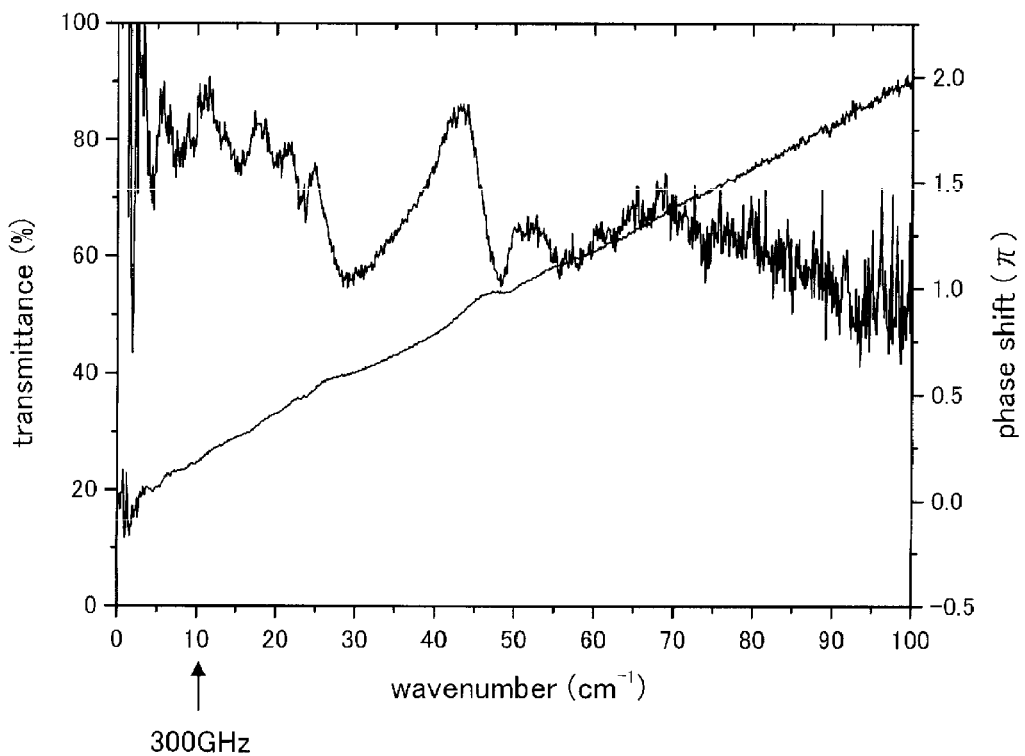
Figure 5A:
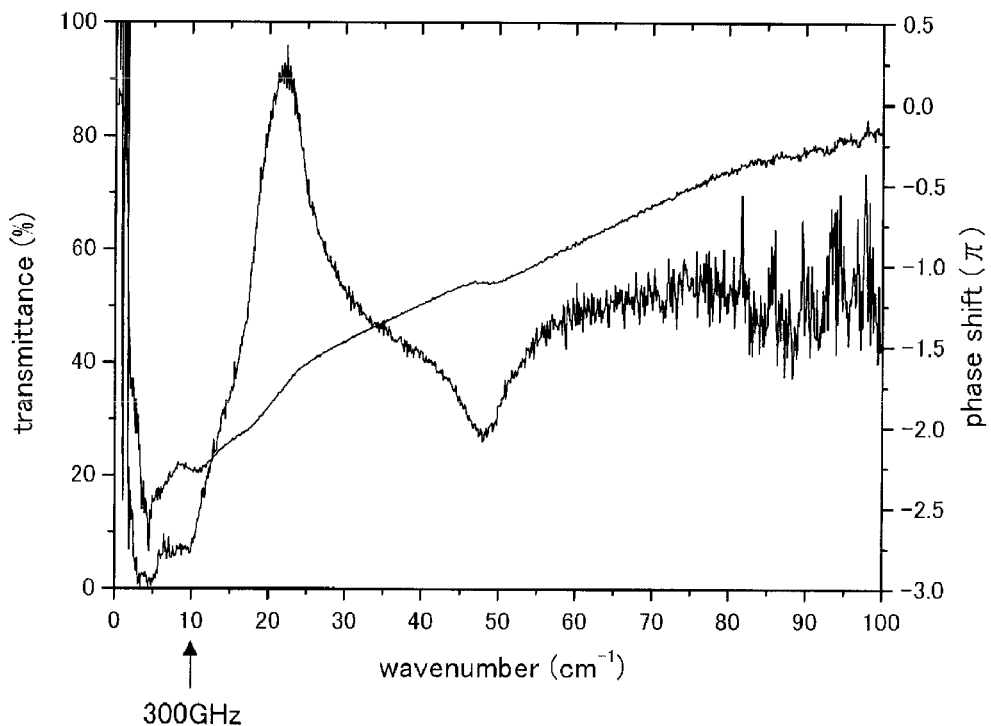
FIGS. 5A and 5B are graphs showing, as a comparative example, characteristics of a wire grid having a conventional structure.
Figure 5B:
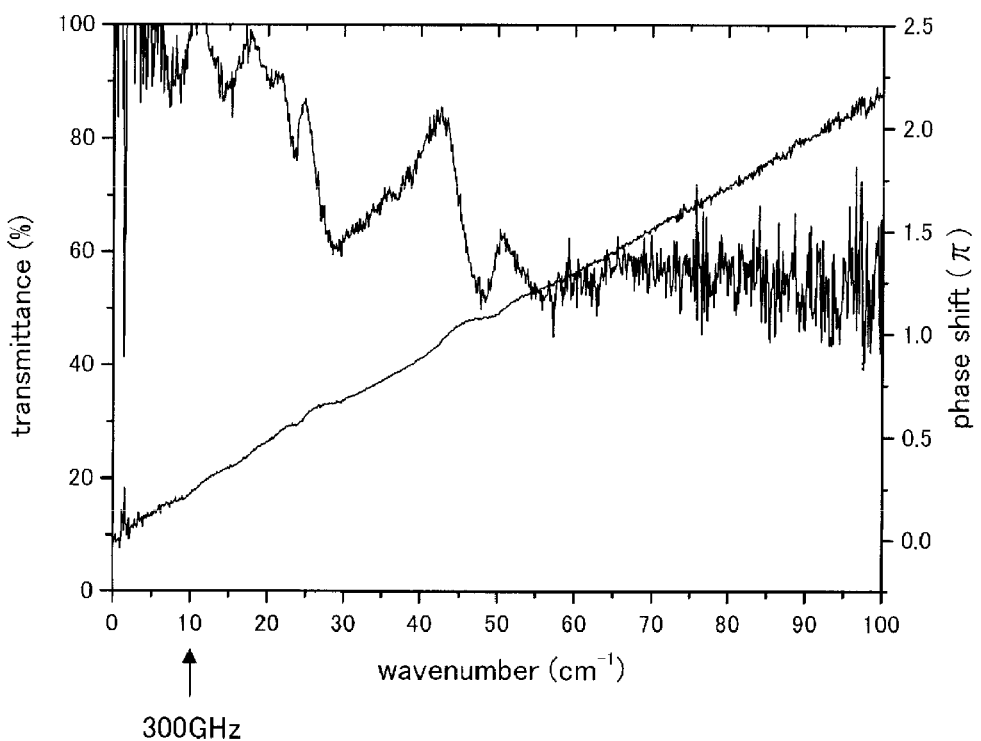

FIGS. 4A to 5B show measurements of transmittance of electromagnetic waves through the wire grid illustrated in FIG. 2 and FIG. 3. FIG. 4A shows the transmittance and the amount of phase shift of electromagnetic waves having a plane of polarization substantially parallel to the longitudinal members 11. FIG. 4B shows the transmittance and the amount of phase shift of electromagnetic waves having a plane of polarization perpendicular to the longitudinal members 11. FIGS. 5A and 5B show measurements for a conventional wire grid including wires having a width of about 0.1 mm and spaced at intervals of about 0.3 mm. FIG. 5A shows the transmittance and the amount of phase shift of electromagnetic waves having a plane of polarization substantially parallel to the wires. FIG. 5B shows the transmittance and the amount of phase shift of electromagnetic waves having a plane of polarization substantially perpendicular to the wires.

That is, FIGS. 5A and 5B show a comparative example which illustrates the differences in characteristics between the presence and absence of the cross members 12.

The measured wavelengths (frequencies) are in the range of about 1 cm to about 1/100 cm (about 30 GHz to about 3 THz) and the longitudinal members 11 are spaced at intervals of about 0.3 mm. Therefore, theoretically, the wire grid 100 acts as a polarizer or an analyzer for wavelengths of about 1/10 cm (frequencies of about 300 GHz) (i.e., for wavelengths in the range of about 1/3 cm to about 1/15 cm (frequencies in the range of about 100 GHz to about 500 GHz)). That is, the target wavelength (frequency) is about 1/10 cm (about 300 GHz). Upward arrows in the drawings indicate this frequency band.

As shown in FIG. 4A, at the target wavelength, the transmittance of electromagnetic waves having a plane of polarization substantially parallel to the longitudinal members is about 10% or less. On the other hand, as shown in FIG. 4B, at substantially the same wavelength, the transmittance of electromagnetic waves having a plane of polarization substantially perpendicular to the longitudinal members 11 is about 90%. This characteristic is similar to that shown in FIG. 5 (i.e., similar to the characteristic of the wire grid which does not include the cross members 12).

Since the wire grid 100 is obtained by processing a thin metal sheet, the processing accuracy is greater than that of the conventional wire grid made by arranging metal strips. Therefore, it is possible to reduce variations in the characteristics and provide outstanding polarizing and analyzing effects for target electromagnetic waves. Variations in the distances between adjacent longitudinal members 11 are in the range of about ±3 μm (e.g., within about 1% of each interval of about 0.3 mm). Since variations in distances between adjacent metal strips of the conventional wire grid are about 20%, variations in the wire grid 100 are less than about 1/10 those in the conventional wire grid.

At the same time, tungsten wires used for the metal strips of the conventional wire grid are less resistant to oxidation and their characteristics deteriorate over time. However, with preferred embodiments of the present invention, since it is easy to apply plating, such as gold-plating, to a processed thin metal sheet, characteristic deterioration caused by aging and environmental changes is significantly reduced.

Although phosphor bronze is used as a base material of the thin metal sheet in the preferred embodiments described above, a non-magnetic metal material having a relatively high Young's modulus, such as stainless steel (SUS), for example, may preferably be used.

Next, wire-grid metal sheets of a second preferred embodiment of the present invention will be described with reference to FIGS. 6A to 6E and FIGS. 7A and 7B.

Although the longitudinal members 11 and the cross members 12 define a lattice grid portion in the first preferred embodiment, the arrangement of the longitudinal members 11 and cross members 12 is not limited to this arrangement. Some exemplary arrangement patterns will be presented in the second preferred embodiment of the present invention.

Figure 6A:
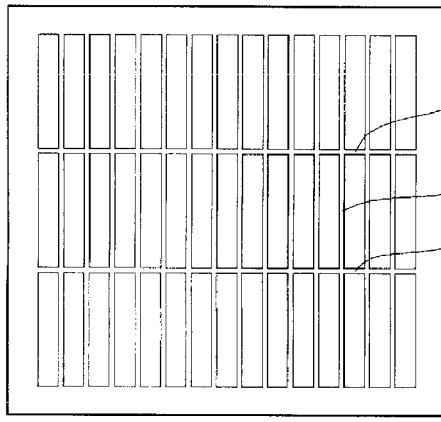
FIGS. 6A to 6E are plan views illustrating various wire-grid metal sheets of a second preferred embodiment of the present invention.
Figure 6B:
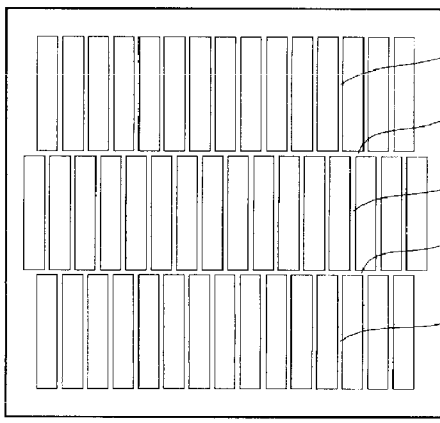

FIGS. 6A to 6E are plan views illustrating different types of wire-grid metal sheets. For comparison, FIG. 6A illustrates a wire-grid metal sheet that is substantially identical to that of the first preferred embodiment. That is, a wire-grid metal sheet 10A illustrated in FIG. 6A includes a plurality of spaced apart strip-shaped longitudinal members 11 extending longitudinally and cross members 12 extending substantially perpendicularly to the longitudinal members 11. A wire-grid metal sheet 10B illustrated in FIG. 6B includes cross members 12 extending substantially perpendicularly and a plurality of spaced strip-shaped longitudinal members 11 extending longitudinally and arranged in a staggered manner.

Figure 6C:
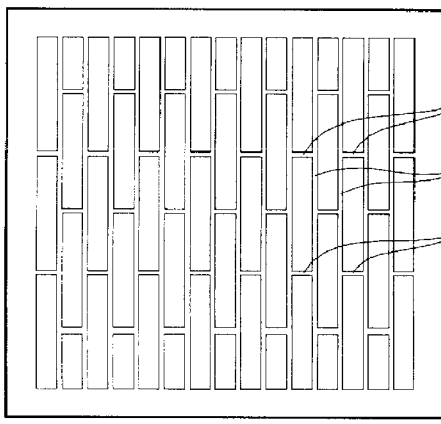

A wire-grid metal sheet 10C illustrated in FIG. 6C includes a plurality of spaced apart strip-shaped longitudinal members 11 extending longitudinally and cross members 12 arranged in a staggered manner.

Figure 6D:
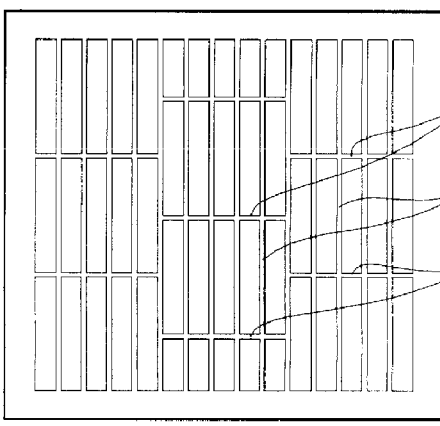

A wire-grid metal sheet 10D illustrated in FIG. 6D includes spaced apart strip-shaped longitudinal members 11 extending longitudinally and cross members 12 arranged in a staggered manner with respect to groups of longitudinal members 11.

Figure 6E:
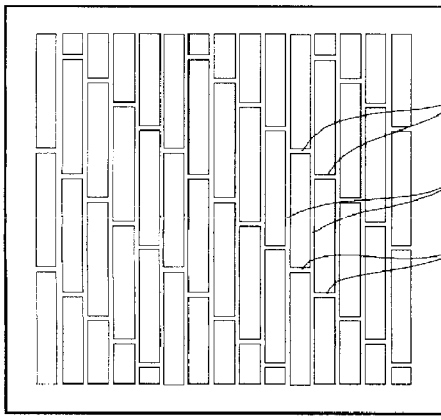

A wire-grid metal sheet 10E illustrated in FIG. 6E includes longitudinal members 11 extending longitudinally and cross members 12 sequentially displaced stepwise in an oblique direction.

Other possible arrangement patterns include a pattern formed by combining some of those described above and a pattern formed by partially modifying one of those described above, for example.

Figure 7A:
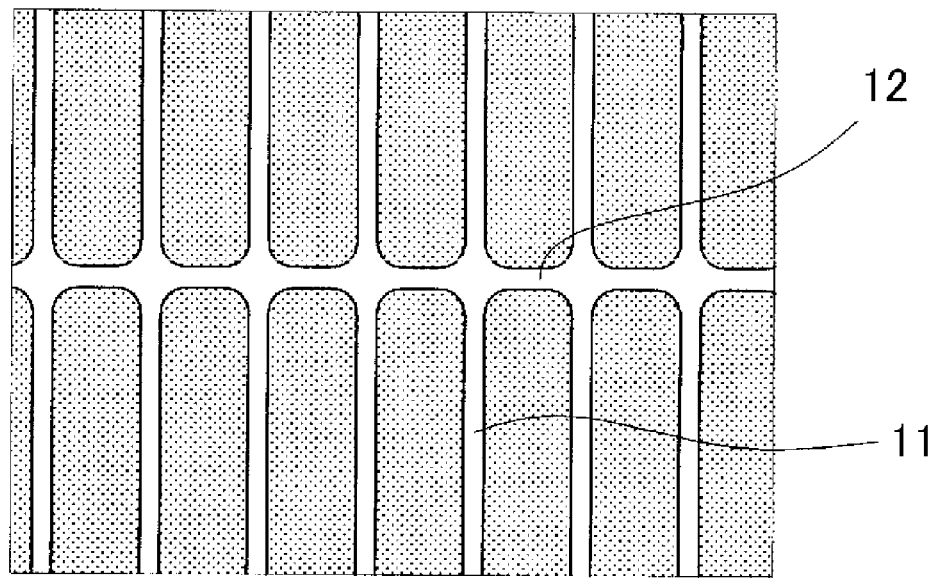
FIGS. 7A and 7B are partially enlarged views of wire-grid metal sheets of the second preferred embodiment of the present invention.
Figure 7B:
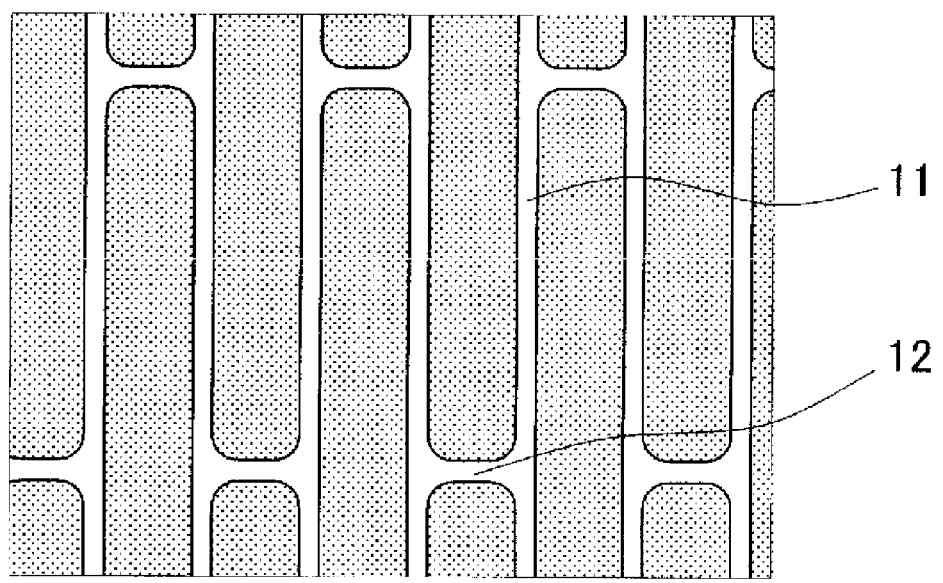

FIG. 7A is an enlarged partial view of the wire-grid metal sheet 10B illustrated in FIG. 6A. FIG. 7B is an enlarged partial view of the wire-grid metal sheet 10C illustrated in FIG. 6C. Although the arrangement pattern of the longitudinal members 11 and cross members 12 of the second preferred embodiment is different from that of the first preferred embodiment, characteristics similar to those of the first preferred embodiment are obtained.

Examples of the method for forming the longitudinal members 11 and the cross members 12 by processing the wire-grid metal sheet described in the first and second preferred embodiments preferably include electrical discharge machining, etching, and laser beam machining, in addition to micro-punching (in which, with a die having mortars and pestles with a diameter of about 1 mm or less, for example, a metal sheet disposed between the mortar and pestle parts is punched under pressure).

In particular, with etching, a wire-grid metal sheet can be made with high precision by coating a phosphor bronze sheet having a thickness of about 0.1 mm with a photosensitive etching resist film, performing exposure using a mask, developing the etching resist film, and removing the etching resist film by acid etching except for portions corresponding to the longitudinal members 11 and cross members 12.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wire-grid metal sheet used as a wire grid for terahertz waves, the wire-grid metal sheet comprising:
   a plurality of spaced apart strip-shaped longitudinal members extending longitudinally; and
   at least one cross member extending substantially perpendicular to the longitudinal members; wherein
   the longitudinal members and the at least one cross member define a grid portion arranged to polarize the terahertz waves; and
   the wire-grid metal sheet is defined only by metal and does not include a substrate.

2. The wire-grid metal sheet according to claim 1, wherein the at least one cross member includes at least two cross members, and the at least two cross members are arranged at an interval at least about five times greater than that of the plurality of longitudinal members.

3. The wire-grid metal sheet according to claim 1, wherein the at least one cross member includes at least two cross members, and the plurality of longitudinal members and the at least two cross members define a lattice pattern.

4. The wire-grid metal sheet according to claim 1, wherein the at least one cross member includes at least two cross members, and the plurality of longitudinal members or the at least two cross members are arranged in a staggered manner.

5. A wire grid comprising:
the wire-grid metal sheet according to claim 1; and
an annular frame attached to opposed sides of the wire-grid metal sheet.

* * * * *